(12) United States Patent
Rochette et al.

(10) Patent No.: US 8,118,214 B2
(45) Date of Patent: Feb. 21, 2012

(54) METHOD AND SYSTEM FOR GENERATING ELECTRONIC KEYS

(75) Inventors: Philip Andre Rochette, Colorado Springs, CO (US); Randall William Mummert, Colorado Springs, CO (US)

(73) Assignee: Atmel Corporation, San Jose, CA (US)

( * ) Notice: Subject to any disclaimer, the term of this patent is extended or adjusted under 35 U.S.C. 154(b) by 956 days.

(21) Appl. No.: 11/389,279

(22) Filed: Mar. 24, 2006

(65) Prior Publication Data

US 2007/0222645 A1 Sep. 27, 2007

(51) Int. Cl.
*G06Q 40/00* (2006.01)
(52) U.S. Cl. .......... 235/379; 235/488; 235/492
(58) Field of Classification Search .......... 235/488, 235/492, 379
See application file for complete search history.

(56) References Cited

U.S. PATENT DOCUMENTS

| | | | |
|---|---|---|---|
| 4,772,782 A * | 9/1988 | Nonat | 235/380 |
| 5,059,373 A | 10/1991 | Hirabayashi | |
| 5,841,866 A * | 11/1998 | Bruwer et al. | 705/66 |
| 6,094,487 A | 7/2000 | Butler et al. | |
| 6,125,185 A | 9/2000 | Boesch | |
| 6,157,826 A | 12/2000 | Lee | |
| 6,185,546 B1 | 2/2001 | Davis | |
| 6,392,427 B1 * | 5/2002 | Yang | 324/755 |
| 6,701,435 B1 | 3/2004 | Numao et al. | |
| 7,298,266 B2 * | 11/2007 | Forster | 340/572.1 |
| 7,395,435 B2 * | 7/2008 | Benhammou et al. | 713/185 |
| 2002/0051535 A1 | 5/2002 | Ezawa | |
| 2004/0015612 A1 * | 1/2004 | Gossel | 710/1 |
| 2004/0059925 A1 * | 3/2004 | Benhammou et al. | 713/189 |
| 2004/0073512 A1 | 4/2004 | Maung | |
| 2004/0247128 A1 | 12/2004 | Patariu et al. | |
| 2005/0081036 A1 | 4/2005 | Hsu | |
| 2005/0160269 A1 | 7/2005 | Akimoto | |
| 2005/0177749 A1 | 8/2005 | Ovadia | |
| 2005/0263605 A1 * | 12/2005 | Muranaka | 235/492 |

FOREIGN PATENT DOCUMENTS

| | | | |
|---|---|---|---|
| WO | WO-2007112040 A2 | 10/2007 | |
| WO | WO-2007112040 A3 | 10/2007 | |

\* cited by examiner

*Primary Examiner* — Daniel Hess
*Assistant Examiner* — Michael Andler
(74) *Attorney, Agent, or Firm* — Fish & Richardson P.C.

(57) ABSTRACT

A method and system for generating electronic keys. The method comprises providing a plurality of devices and generating an electronic key for each device of the plurality of devices, wherein the electronic keys are generated substantially simultaneously. According to the system and method disclosed herein, the electronic keys for all of the devices are generated in the same amount of time that is required to generate one electronic key for one device.

15 Claims, 6 Drawing Sheets

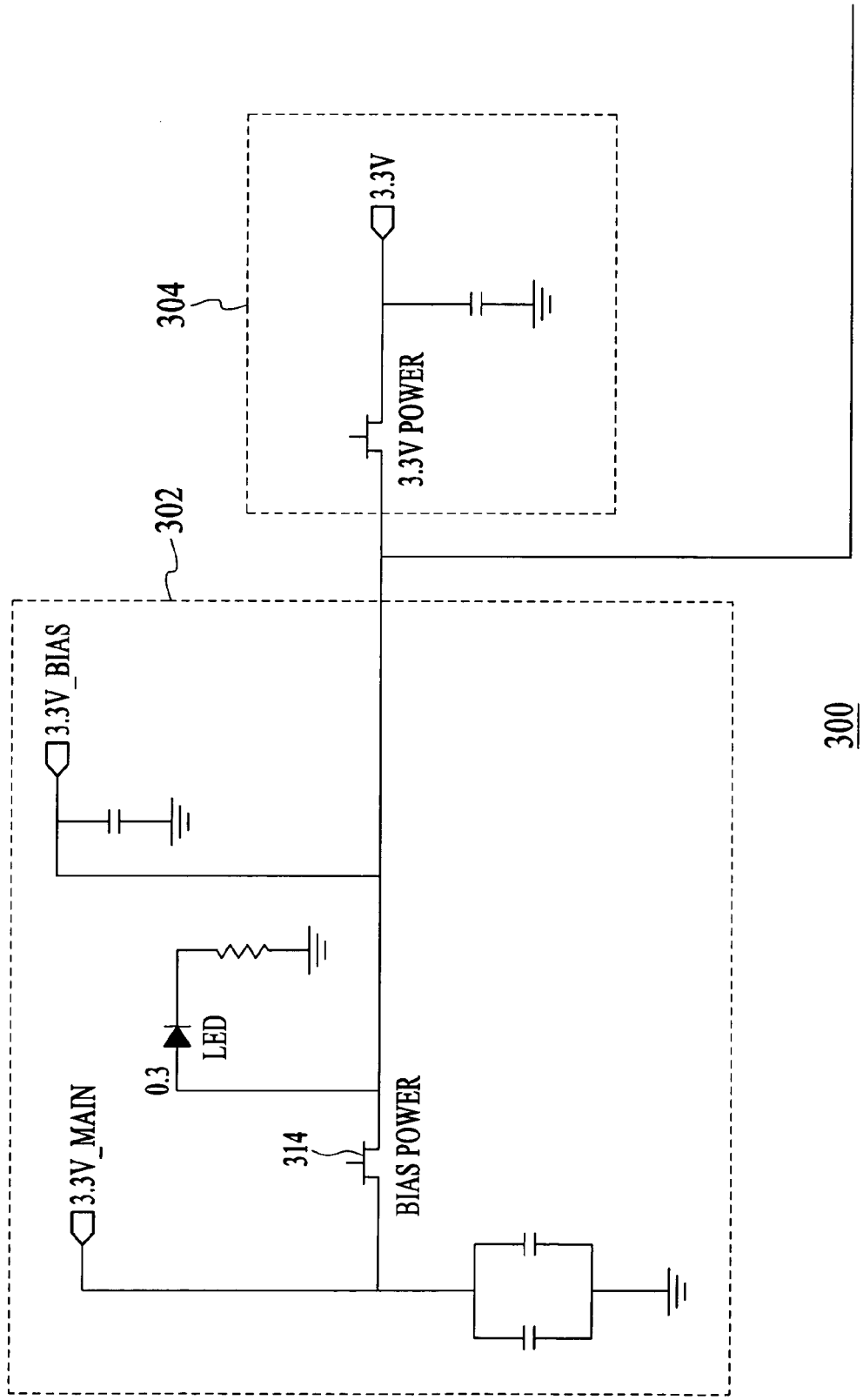
FIG.3/1

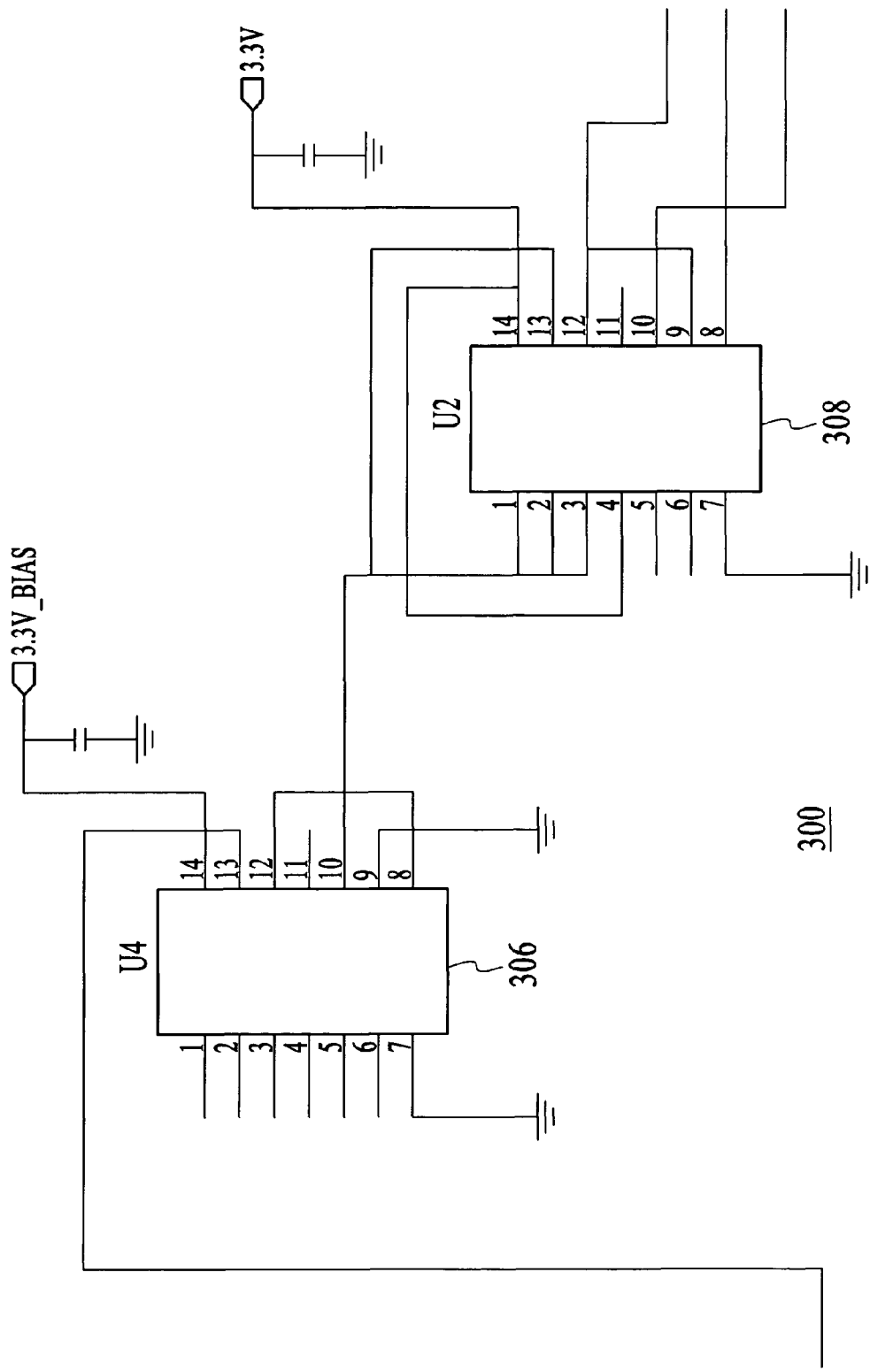

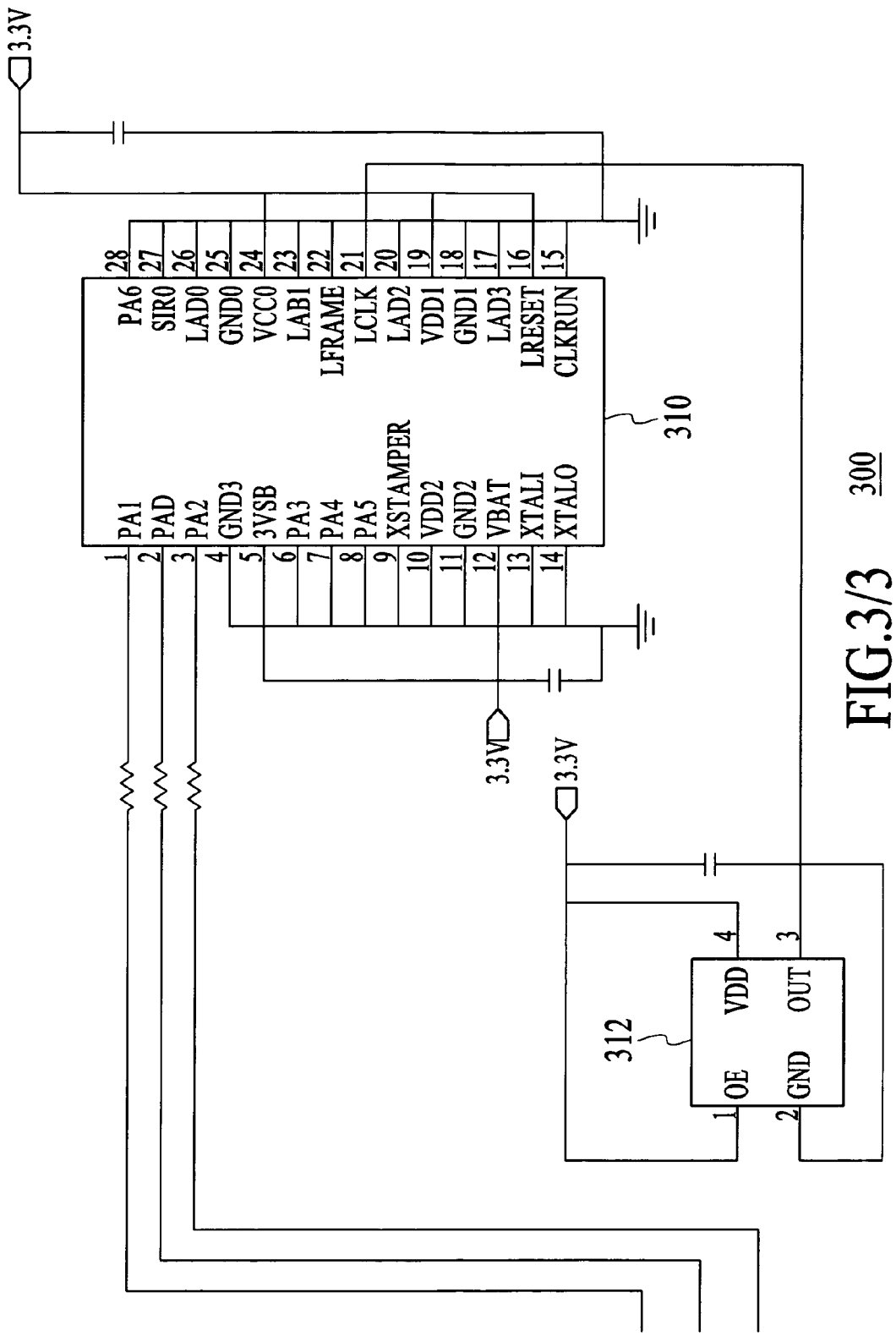
FIG.3/3

METHOD AND SYSTEM FOR GENERATING ELECTRONIC KEYS

FIELD OF THE INVENTION

The present invention relates to communication systems, and more particularly to a method and system for generating electronic keys.

BACKGROUND OF THE INVENTION

Electronic keys are well known and are typically used to provide access to secured devices or systems. For example, an electronic key may be required to execute functions or code on a device. Such functions may include, for example, accessing data in a memory device.

To generate an electronic keys for devices, each device is individually inserted into a socket, which is connected to a key generation system. Accordingly, after an electronic key is generated for one device, a new device can then be inserted into the socket. A problem with this conventional method is that generating electronic keys is time consuming.

Accordingly, what is needed is an improved system and method for generating electronic keys. The present invention addresses such a need.

SUMMARY OF THE INVENTION

A method and system for generating electronic keys are disclosed. The method comprises providing a plurality of devices and generating an electronic key for each device of the plurality of devices, wherein the electronic keys are generated substantially simultaneously. According to the system and method disclosed herein, the electronic keys for all of the devices are generated in the same amount of time that is required to generate one electronic key for one device.

BRIEF DESCRIPTION OF THE DRAWINGS

FIG. 3 is a schematic diagram of a biasing circuit, which can be used to implement the enabling biasing circuit of FIG. 1, in accordance with the present invention.

DETAILED DESCRIPTION OF THE INVENTION

The present invention relates to communication systems, and more particularly to a method and system for generating electronic keys. The following description is presented to enable one of ordinary skill in the art to make and use the invention, and is provided in the context of a patent application and its requirements. Various modifications to the preferred embodiment and the generic principles and features described herein will be readily apparent to those skilled in the art. Thus, the present invention is not intended to be limited to the embodiments shown, but is to be accorded the widest scope consistent with the principles and features described herein.

A method and system in accordance with the present invention for generating electronic keys are disclosed. The method comprises providing a plurality of devices. While the devices are still in a molded strip and before the devices are singulated, electronic keys are generated for each device of the plurality of devices and the electronic keys are generated substantially simultaneously. To more particularly describe the features of the present invention, refer now to the following description in conjunction with the accompanying figures.

Figure 1:
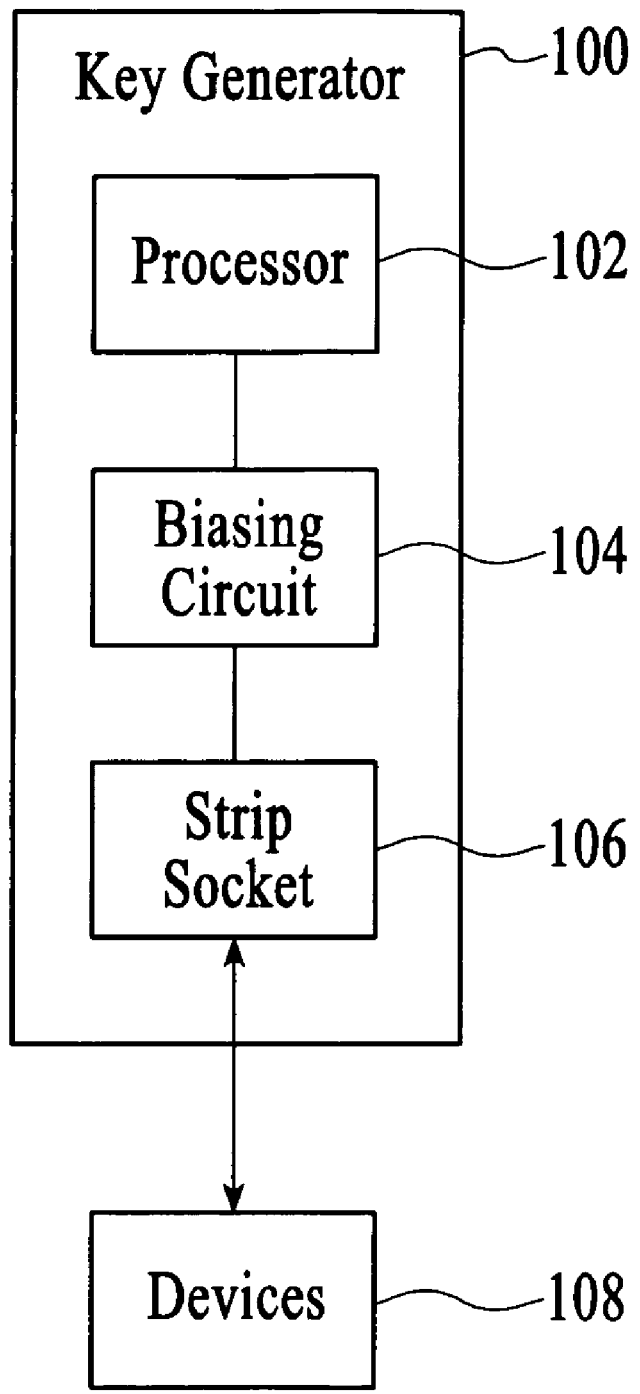
FIG. 1 is a block diagram of an electronic key generator in accordance with the present invention.

FIG. 1 is a block diagram of an electronic key generator 100 in accordance with the present invention. The electronic key generator 100 includes a processor 102, a biasing circuit 104, and a strip socket 106, which connects to devices 108 that are in a molded strip. In operation, when the molded strip is inserted into the strip socket 106, the strip socket 106 makes electrical contact with each individual device 108. As described in further detail below, the electronic key generator 100 generates electronic keys for the devices while the devices are still in the molded strip, prior to singulation. The electronic key generation for all of the devices 108 is performed substantially simultaneously. This provides substantial advantages over methods of electronic key generation where electronic keys are generated one by one for each device after each device has been singulated. Generating multiple electronic keys for multiple devices takes the same amount of time as generating one electronic key for a single device. For example, the amount of time required to generate electronic keys for 40 devices in a molded strip would take the same amount time as generating one electronic key for one singulated device.

Figure 2:
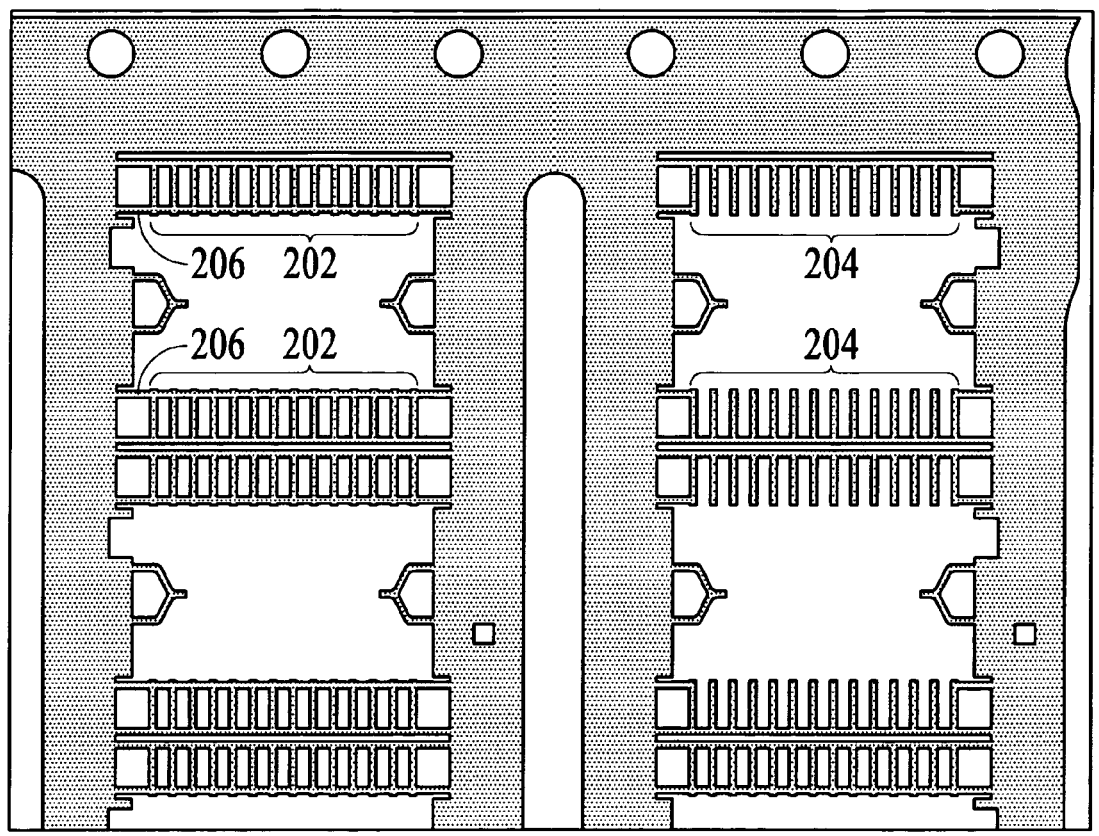
FIG. 2 is a diagram of a portion of a molded strip, including lead frames, which can be used to implement some of the devices of FIG. 1, in accordance with the present invention.

FIG. 2 is a diagram of a portion of a molded strip 200, including lead frames 202 and 204, which can be used to implement some of the devices 108 of FIG. 1, in accordance with the present invention. The molded strip 200 also includes dambars 206, which are used to mold the device packages and functions as a physical stop, allowing mold compound to travel out a short distance but no farther. This extra mold compound forms a flash between the leads and in the area between the edge of the package and the dambar. After the devices are molded, the dambar 206 is removed (i.e., cut out) and the lead fingers of the lead frames 202 and 206 are cut and isolated from their respective tiebars. FIG. 2 illustrates the lead frames 202 with the dambar 206 still intact and the lead frames 204 with the dambar removed. As described in further detail below, after the dambar 206 is removed, each device is electrically isolated from the other devices in the molded frame so that each device can be powered up, clocked, and can receive input signals.

FIG. 3 is a schematic diagram of a biasing circuit 300, which can be used to implement the biasing circuit 104 of FIG. 1, in accordance with the present invention. In a specific embodiment, the biasing circuit 300 includes a bias power source 302, a secondary power source 304, a NAND gate 306 (e.g., a quad 2-input NAND gate), an inverter 308 (e.g., a hex inverter), a security chip 310 (e.g., an Atmel Trusted Computing Group (TCG) AT97SC32XX chip), and a crystal oscillator 312 (e.g., a 33 Mhz clock).

In operation, the bias power source 302 supplies a voltage (e.g., 3.3V) via a switch 314 to the NAND gate 306. The secondary power source 304 supplies a voltage (e.g., 3.3V) to the inverter 308, to the security chip 310, and to the crystal oscillator 312. The crystal oscillator 312 initializes the security chip 310 and the inverter 308, and provides a clock signal (e.g., 33 Mhz) to the security chip 310. In a specific implementation, the switch 314 is a momentary "ON" switch, which, when pressed, forces a low (0) input at the NAND gate 306 (e.g., at pin 11). Also, the inverter 308 (e.g., from pins 3, 9, and 13) initialize its output (e.g., pins 8, 10, and 12) to high (1), low (0), high (1), respectively. Furthermore, in this specific implementation, firmware in the security chip 310 searches for a high (1), high (1), low (0) combination on pins 1, 2, 3, respectively. Once the security chip 310 sees a high (1), high (1), low (0) combination, the firmware of the security chip 310 generates an electronic key for a given device.

Referring to both FIGS. 1 and 3 together, in operation, the biasing circuit biases the devices 108, and the devices 108 in turn generate a primary number, which is the electronic key generator 100 uses to generate an electronic key. The primary number is self-generated by each device 108 using fused links within the silicon of each device 108. This insures that each device a unique primary number.

The generation of an electronic key takes a certain amount of time (e.g., 3 seconds to 3 minutes) to generate. This can take a long time if there are a large number of devices, and the electronic keys are generated in a singulated fashion. The electronic key generator 100 saves a substantial amount of time, because the electronic key generator 100 generates electronic keys in parallel.

Figure 4:
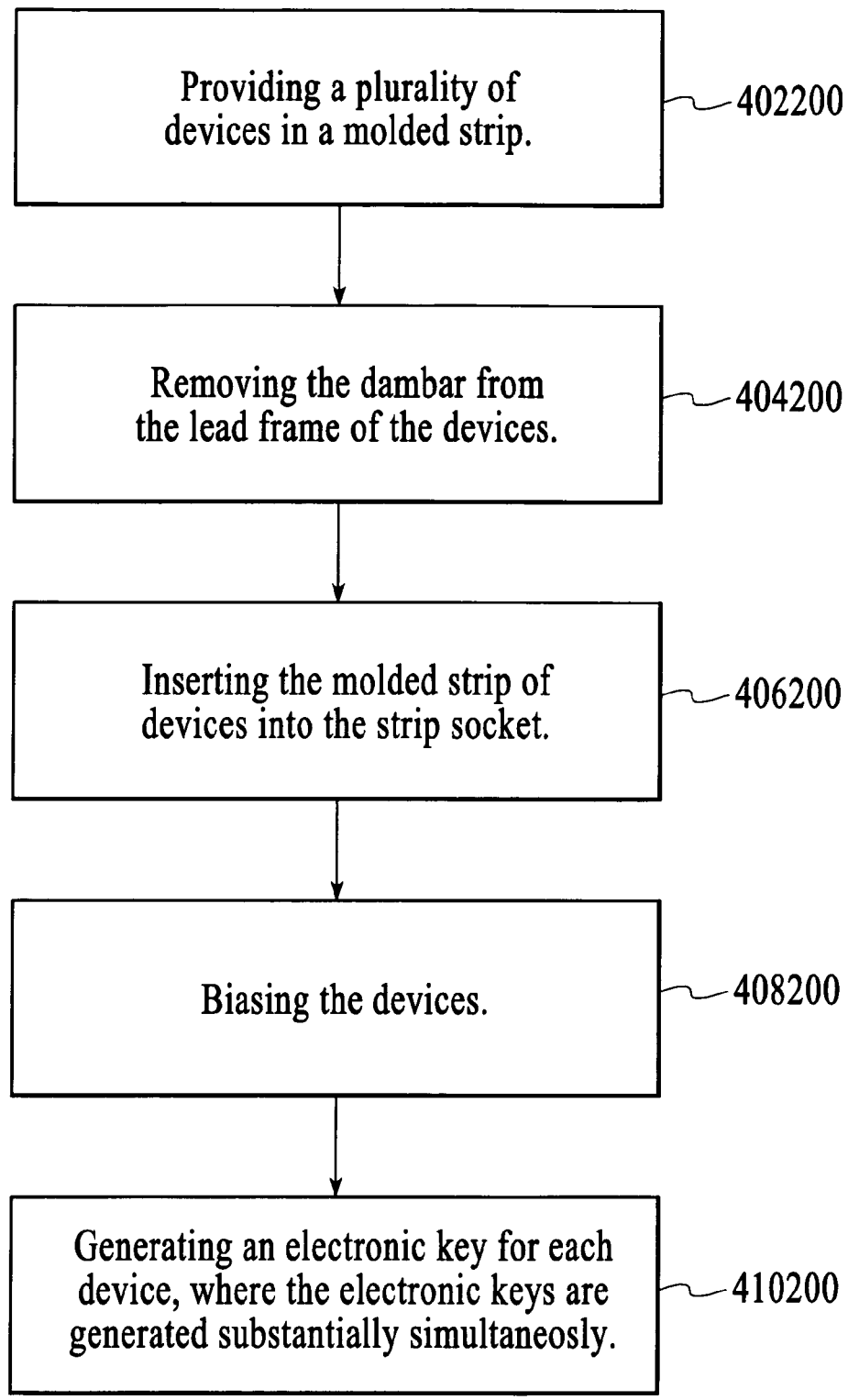
FIG. 4 is a flow chart showing a method for generating electronic keys in accordance with the present invention.

FIG. 4 is a flow chart showing a method for generating electronic keys in accordance with the present invention. Referring to both FIGS. 1 and 4 together, the process begins in a step 402 when the plurality of devices is provided. In a preferred embodiment, the devices are provided in a molded strip. Next, in a step 404, the dambar is removed from the lead frame of the devices (FIG. 2). This occurs after the devices have been molded. Once the dambar is removed, each device is electrically isolated from all other devices in the molded strip. Next, in a step 406, the molded strip of devices is inserted into the strip socket, which will allow the devices to be powered up, clocked, and able to receive input signals. Next, in a step 408, the biasing circuit biases the devices. Next, in a step 410, an electronic key for each device is generated, where the electronic keys are generated substantially simultaneously. Accordingly, the electronic keys are generated in parallel and before the devices are removed from a molded strip (i.e., before the devices are singulated).

According to the system and method disclosed herein, the present invention provides numerous benefits. For example, it generates keys in parallel. Generating multiple electronic keys for multiple devices takes the same amount of time as generating one electronic key for a single device.

A method and system in accordance with the present invention for generating electronic keys has been disclosed. The method comprises providing a plurality of devices. While the devices are still in a molded strip and before the devices are singulated, electronic keys are generated for each device of the plurality of devices and the electronic keys are generated substantially simultaneously.

The present invention has been described in accordance with the embodiments shown. One of ordinary skill in the art will readily recognize that there could be variations to the embodiments, and that any variations would be within the spirit and scope of the present invention. For example, the present invention can be implemented using hardware, software, a computer readable medium containing program instructions, or a combination thereof. Software written according to the present invention is to be either stored in some form of computer-readable medium such as memory or CD-ROM, or is to be transmitted over a network, and is to be executed by a processor. Consequently, a computer-readable medium is intended to include a computer readable signal, which may be, for example, transmitted over a network. Accordingly, many modifications may be made by one of ordinary skill in the art without departing from the spirit and scope of the appended claims.

What is claimed is:

1. A method for generating electronic keys for a plurality of devices, the method comprising:
    providing a plurality of devices in a molded strip;
    coupling the plurality of devices to a single biasing circuit, such that the single biasing circuit causes each of the devices in the molded strip to self-generate a unique primary number in response to signals from the single biasing circuit;
    generating, by a security chip, an electronic key for each of the devices in parallel using the associated primary number while the devices reside in the molded strip and remain coupled to the single biasing circuit, the electronic key being unique to each of the devices; and
    providing power from the single biasing circuit to the security chip.

2. The method of claim 1 wherein the molded strip is a lead-frame strip that results from device fabrication,
    wherein the plurality of devices as provided in the molded strip include dambars,
    wherein prior to coupling the plurality of devices to the single biasing circuit, the method comprises:
    removing the dambars; and
    inserting the molded strip into a strip socket, the strip socket to make an individual electrical contact with lead frames of each of the devices to couple each of the devices to the single biasing circuit,
    wherein after the electronic keys are generated, the devices are singulated.

3. The method of claim 2 wherein the electronic key generated by the security chip for each of the devices is used to execute functions or code on the associated device, and
    wherein the primary number is self-generated by each of the devices using fused links within each of the devices to ensure that each of the devices generates a unique primary number.

4. The method of claim 3, wherein the security chip is provided with powered prior to coupling the plurality of devices to the single biasing circuit.

5. The method of claim 4 further comprising configuring an inverter to provide a predetermined output to the security chip to cause the security chip to generate an electronic key for one of the devices.

6. A computer-readable medium that stores program instructions for generating electronic keys for a plurality of devices that are provided in a molded strip, the program instructions which when executed by a processor cause the processor to:
    couple the plurality of devices that reside in the molded strip to a single biasing circuit to cause each of the devices to self-generate a unique primary number in response to signals from the single biasing circuit;
    cause a security chip to generate an electronic key for each of the devices in parallel using the associated primary number while the devices reside in the molded strip and remain coupled to the single biasing circuit, the electronic key being unique to each of the devices and
    provide power from the single biasing circuit to the security chip.

7. The computer-readable medium of claim 6 wherein the molded strip is a lead-frame strip that results from device fabrication,
    wherein the plurality of devices as provided in the molded strip include dambars,
    wherein prior to coupling the plurality of devices to the single biasing circuit, the dambars are removed and the molded strip is inserted into a strip socket, the strip socket to make an individual electrical contact with lead frames of each of the devices to couple each of the devices to the single biasing circuit, and wherein after the electronic keys are generated, the devices are singulated.

8. The computer-readable medium of claim 7 wherein the electronic key generated by the security chip for each of the devices is unique to each of the devices and used to execute functions or code on the associated device, and wherein the primary number is self-generated by each of the devices using fused links within each of the devices to ensure that each of the devices generates a unique primary number.

9. The computer-readable medium of claim 8 wherein the program instructions further configure the processor to power the security chip with the single biasing circuit prior to coupling the plurality of devices to the single biasing circuit.

10. The computer-readable medium of claim 9 wherein the program instructions further configure an inverter to provide a predetermined output to the security chip to cause the security chip to generate an electronic key for one of the devices.

11. A system to generate electronic keys for a plurality of devices, the system comprising:

a strip socket for inserting the plurality of devices that reside in a molded strip;

a single biasing circuit to cause each of the devices to self-generate a unique primary number in response to signals from the single biasing circuit, the strip socket being configured to make an individual electrical contact with lead, frames of each of the devices to couple each of the devices to the single biasing circuit; and a security chip to generate an electronic key for each of the devices in parallel using the associated primary number while the devices reside in the molded strip and remain coupled to the single biasing circuit, the electronic key being unique to each of the devices, wherein the single biasing circuit is configured to provide power to the security chip.

12. The system of claim 11 wherein the molded strip is a lead-frame strip that results from device fabrication, wherein the plurality of devices as provided in the molded strip include dambars used to mold device packages housing the devices, wherein prior to the devices being coupled to the single biasing circuit, the dambars are removed, and wherein after the electronic keys are generated, the devices are singulated.

13. The system of claim 12 wherein the electronic key generated by the security chip for each of the devices is used to execute functions or code on the associated device, and wherein the primary number is self-generated by each of the devices using fused links within each of the devices to ensure that each of the devices generates a unique primary number.

14. The system of claim 13 wherein the security chip is powered prior to the plurality of devices being coupled to the single biasing circuit.

15. The system of claim 14 further comprising an inverter configured to provide a predetermined output to the security chip to cause the security chip to generate an electronic key for one of the devices.

* * * * *